(12) United States Patent
Gentile

(10) Patent No.: US 9,308,962 B1
(45) Date of Patent: Apr. 12, 2016

(54) REAR MOTORCYCLE SUSPENSION

(76) Inventor: Daniel A. Gentile, Erie, PA (US)

(*) Notice: Subject to any disclaimer, the term of this patent is extended or adjusted under 35 U.S.C. 154(b) by 718 days.

(21) Appl. No.: 13/317,213

(22) Filed: Oct. 11, 2011

(51) Int. Cl.
*B62K 25/30* (2006.01)
*B62K 25/28* (2006.01)

(52) U.S. Cl.
CPC .............. *B62K 25/283* (2013.01); *B62K 25/30* (2013.01)

(58) Field of Classification Search
CPC .............................. B62K 25/283; B62K 25/30
USPC ......... 280/285, 284, 277, 275, 276, 283, 286; 180/227, 219
See application file for complete search history.

(56) References Cited

U.S. PATENT DOCUMENTS

| | | | | | |
|---|---|---|---|---|---|
| 927,989 | A | * | 7/1909 | Meiser | 280/277 |
| 1,048,322 | A | * | 12/1912 | Kuehn | 280/285 |
| 1,056,492 | A | * | 3/1913 | Bilsten | 280/284 |
| 1,058,839 | A | * | 4/1913 | Baldon | 280/285 |
| 1,147,415 | A | * | 7/1915 | McLeod | 280/284 |
| 1,149,432 | A | * | 8/1915 | Escherich | 280/285 |
| 1,171,371 | A | * | 2/1916 | Wagner | 280/284 |
| 1,189,874 | A | * | 7/1916 | Schickel | 280/277 |
| 1,272,399 | A | * | 7/1918 | Douglas | 280/284 |
| 1,606,093 | A | * | 11/1926 | Mohin | 280/285 |
| 1,834,308 | A | * | 12/1931 | Harley | 280/276 |
| 2,377,124 | A | * | 5/1945 | Ballamy et al. | 180/226 |
| 2,537,679 | A | * | 1/1951 | Kraeft | 280/277 |
| 3,954,284 | A | * | 5/1976 | Phillips et al. | 280/277 |
| 4,775,163 | A | * | 10/1988 | McGowan et al. | 280/277 |
| 5,163,697 | A | * | 11/1992 | Kastan | 280/276 |
| 5,482,261 | A | * | 1/1996 | Ortega | 267/168 |
| 5,855,388 | A | * | 1/1999 | Brewer | 280/288.4 |
| 6,164,675 | A | * | 12/2000 | Pickering | 280/277 |
| 6,533,305 | B1 | * | 3/2003 | Falk | 280/276 |
| 7,467,787 | B2 | * | 12/2008 | Adoline et al. | 267/291 |

* cited by examiner

*Primary Examiner* — Joseph Rocca
*Assistant Examiner* — Jacob Knutson
(74) *Attorney, Agent, or Firm* — Richard K Thomson

(57) ABSTRACT

A rear motorcycle suspension enhances the performance of the bike without compromising the appearance. Two pairs of nested springs are connected between a spring plate secured to the motorcycle chassis and a pair of triangularly-shaped rockers which support the axle of the rear wheel providing shock absorption for that wheel.

3 Claims, 4 Drawing Sheets

REAR MOTORCYCLE SUSPENSION

BACKGROUND AND SUMMARY OF THE INVENTION

The present invention is directed to the field of two-wheeled vehicles. More particularly, the present invention is directed a rear motorcycle suspension system which enhances both the aesthetic appearance and the performance of the bike.

While some efforts have been made to provide a front mount which is both aesthetically pleasing and which functionally reduces bounce of the front wheel, for the most part, efforts to improve the performance of the rear suspension system have come at the cost of a "clunky" looking mount or, if having an acceptable appearance, the suspension has done little to enhance performance. It is among the objects of the present invention to provide a rear suspension system which enhances both appearance and performance of the bike.

The rear suspension system for a motorcycle of the present invention includes a) a pair of rockers, one rocker of the pair positioned on each side of the rear wheel, the pair of rockers being pivotally mounted to a bifurcated frame of the motorcycle and receiving an axle which mounts the rear wheel, the bifurcated frame forming two parallel elements; b) a spring fork having two arms, a first end of each of the arms pivotally connected to one of the pair of rockers and a second end integrally connected to a reaction surface, the reaction surface extending between the two arms of the spring fork; c) a spring plate extending between and attached to the two parallel elements of the bifurcated frame; d) at least one rod having a first proximate end secured to the reaction surface of the spring fork and a second distal end extending through the spring plate; e) at least one first spring encircling a first portion of the rod extending from the reaction surface of the spring fork to the spring plate; f) at least one second spring encircling a second portion of the rod extending beyond the spring plate; g) reaction means attached to the distal end of the rod against which the at least one second spring reacts. Preferably, the at least one first spring and one second spring comprises two first springs and two second springs. Further, more preferably, each of the at least two first springs and two second springs comprise pairs of nested springs.

Various other features, advantages, and characteristics of the present invention will become apparent after a reading of the following detailed description.

BRIEF DESCRIPTION OF THE DRAWINGS

The preferred embodiment(s) of the present invention is/are described in conjunction with the associated drawings in which like features are indicated with like reference numerals and in which.

DETAILED DESCRIPTION OF THE PREFERRED EMBODIMENT(S)

Figure 1:
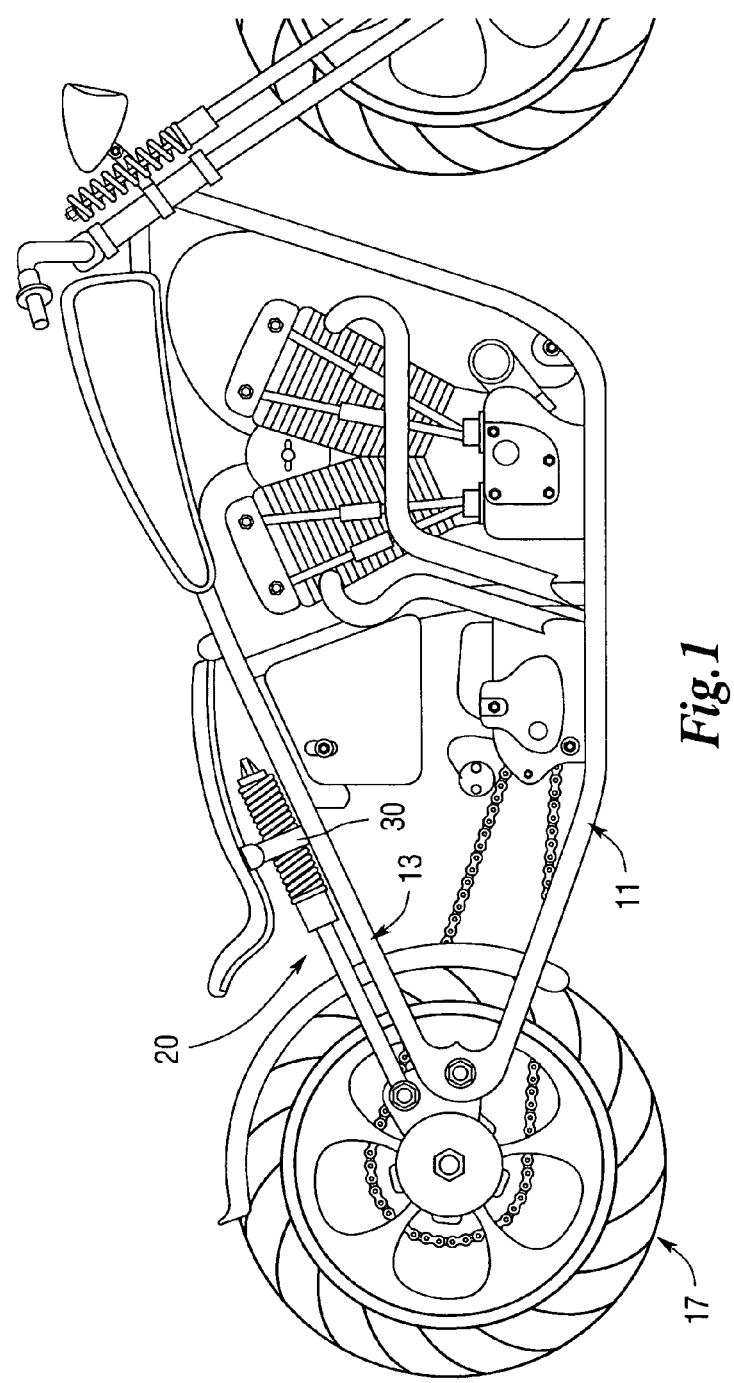
FIG. 1 is a side schematic view of a first embodiment of the rear motorcycle mount of the present invention shown assembled on a bike.
Figure 2:
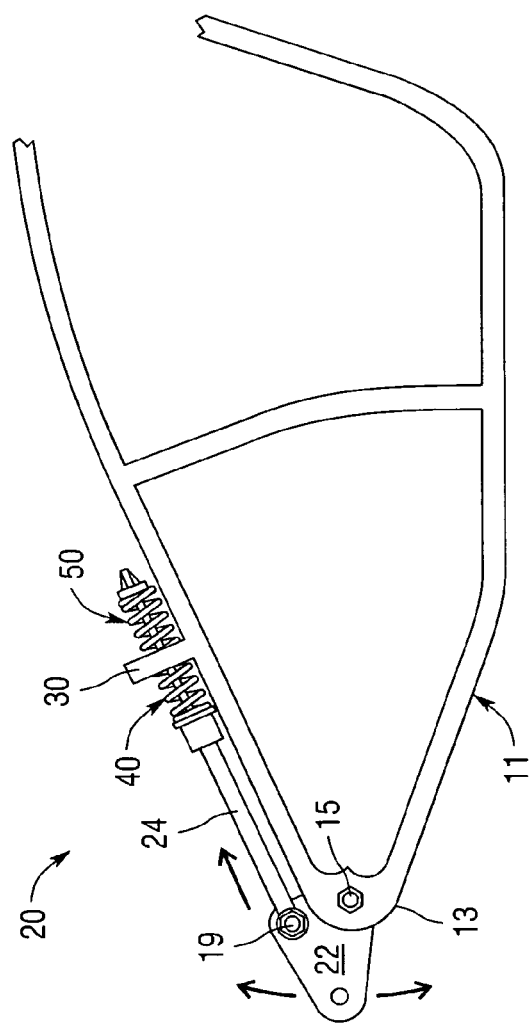
FIG. 2 is an enlarged side view of the first embodiment.
Figure 3:
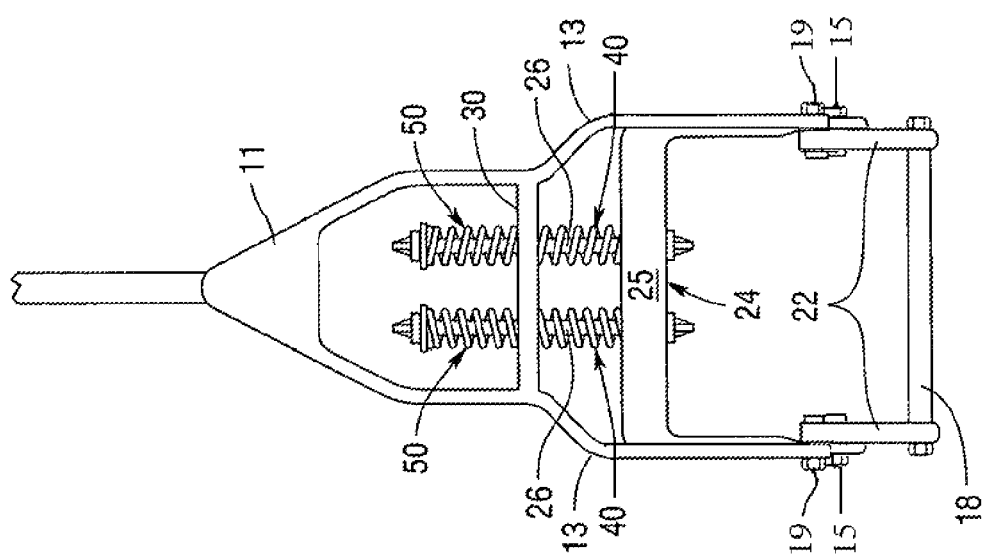
FIG. 3 is an top view of the first embodiment.

A first embodiment of the rear motorcycle suspension of the present invention is depicted in FIGS. 1-3 generally at 20. As best seen in FIGS. 1 and 2, rear suspension 20 includes a pair of triangularly-shaped rockers 22 which are pivotally mounted to arms 13 of bifurcated frame 11 by pivot studs 15 near one apex of the triangle. One of said pair of rockers 22 extends on either side of rear wheel 17 (FIG. 1) and receive rear axle 18 which extends there between at a second apex. U-shaped spring fork 24 is pivotally attached by pins 19 to the third apex of triangularly-shaped rockers 22. At least one rod and, preferably, a pair of rods 26 extend from the base 25 of U-shaped fork 24 through spring plate 30 which extends between and is welded to bifurcated frame arms 13. Base 25 of spring fork 24 forms a reaction surface against which springs 40 operate. As best seen in FIGS. 1 and 2, spring plate 30 extends above the plane of the frame arms 13.

Figure 4:
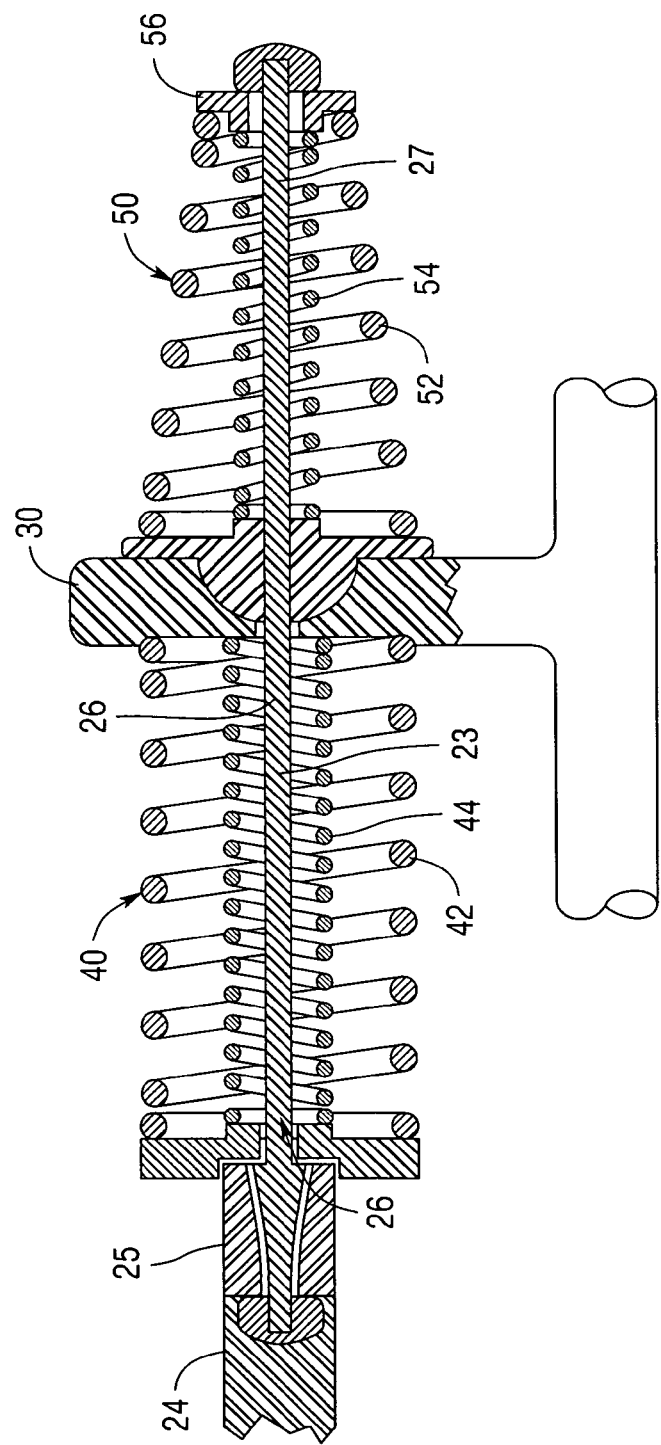
FIG. 4 is a cross-sectional side view of an alternate configuration of the nested spring stacks.

At least one spring means 40 encircles a first portion 23 of each rod 26 (FIG. 4) extending between base 25 and spring plate 30 while a second spring means 50 encircles a second portion 27 of each rod 26 extending beyond spring plate 30. First spring means 40 cushions the movement of rod 26 as triangularly shaped rockers 22 flex upwardly and second spring means 50 cushion the rebound of rod 26 as rockers 22 are restored to their at rest positions. As best seen in FIG. 4, each spring means 40 comprises a first large gauge outer spring 42 and second smaller gauge inner spring 44 which work cooperatively as spring means 40. Second spring means 50 comprises a cooperatively acting pair of springs 52 and 54, spring 52 being a larger gauge outer spring, and spring 54 being a smaller gauge inner spring. As depicted in FIG. 4, spring 52 tapers throughout its length. However, more preferably, the taper is confined to the last several turns adjacent retention nut 56. Retention nut 56 forms a reaction means against which springs 52, 54 push. Preferably, the spring plate 30 is painted to match/contrast with the colors of the bike's frame 11 and the rockers 22, the spring fork 24, and springs 42, 52 are chromed to make the rear suspension 20 not only a functional addition to the bike but an aesthetically pleasing one, as well. Alternatively, all elements can be painted in matching or contrasting colors.

Various changes, alternatives, and modifications will become apparent to a person of ordinary skill in the art after a reading of the foregoing specification. It is intended that all such changes, alternatives, and modifications as fall within the scope of the appended claims be considered part of the present invention.

I claim:

1. A suspension system for a rear wheel of a motor cycle, said suspension system comprising:
    a) a pair of rockers, one rocker of said pair positioned on each side of the rear wheel, said pair of rockers being pivotally mounted to a bifurcated frame of the motorcycle and receiving an axle which mounts the rear wheel, the bifurcated frame forming two parallel elements, one of said parallel elements extending along side and being pivotally attached to a first of said pair of rockers and a second one of said two parallel elements extending along side and being pivotally attached to a second of said pair of rockers, wherein said pair of rockers are located between the parallel elements in a lateral direction;
    b) a spring fork having two arms, a first end of each of said arms pivotally connected to one of said pair of rockers and a second end integrally connected to a reaction surface, said reaction surface extending between said two arms of said spring fork;
    c) a spring plate extending between and attached to the two parallel elements of the bifurcated frame;

d) at least one rod having a first proximate end secured to said reaction surface of said spring fork and a second distal end extending through said spring plate;
e) at least one first spring means encircling a first portion of said at least one rod extending from said reaction surface of said spring fork to said spring plate, said first spring means cushioning movement of said first rod;
f) at least one second spring means encircling a second portion of said at least one rod extending beyond said spring plate, said second spring means cushioning rebound movement of said at least one rod;
g) reaction means attached to said distal end of said rod against which said at least one second spring means reacts.

2. The suspension system of claim 1 wherein said at least one first spring means comprises at least a first and a second spring member and said one second spring means comprises at least a third and a fourth spring member.

3. The suspension system of claim 2 wherein each of said at least two first spring means and two second spring means comprise pairs of nested springs for a total of eight individual springs configured as four sets of nested springs.

\* \* \* \* \*